(No Model.)
C. CLOSZ.
GRAIN SEPARATING SCREEN FOR THRASHING MACHINES.
No. 548,154. Patented Oct. 15, 1895.
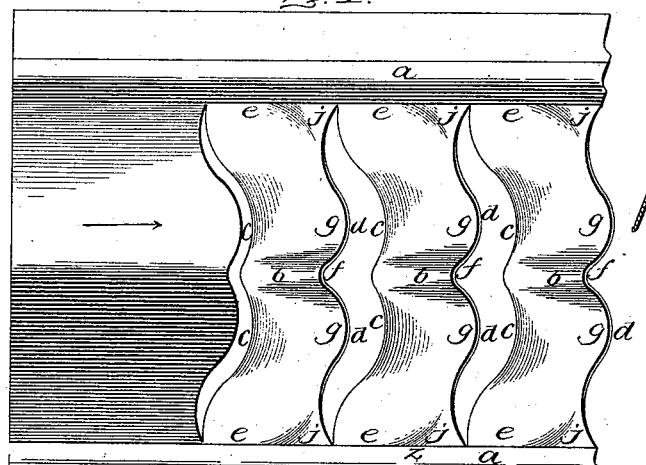
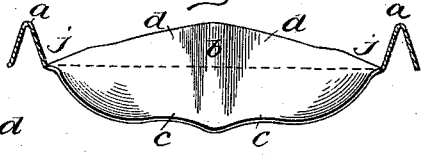
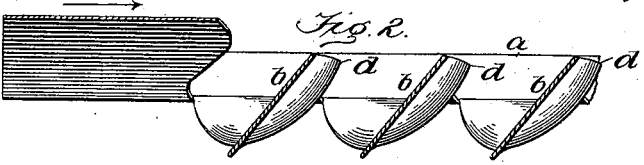
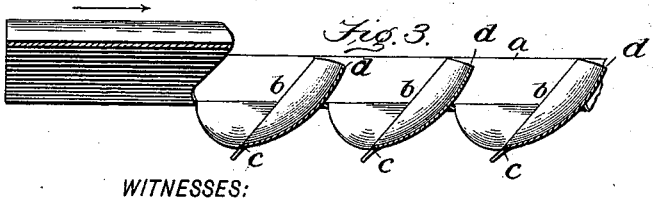
WITNESSES:
Edwin L. Bradford
Rob't A. McPherson Jr.
INVENTOR
Charles Closz
BY
Johnson & Johnson
ATTORNEYS.

UNITED STATES PATENT OFFICE.

CHARLES CLOSZ, OF WEBSTER CITY, IOWA, ASSIGNOR TO THE CLOSZ & HOWARD MANUFACTURING COMPANY, OF SAME PLACE.

GRAIN-SEPARATING SCREEN FOR THRASHING-MACHINES.

SPECIFICATION forming part of Letters Patent No. 548,154, dated October 15, 1895.

Application filed August 10, 1895. Serial No. 558,915. (No model.)

*To all whom it may concern:*

Be it known that I, CHARLES CLOSZ, of Webster City, in the county of Hamilton and State of Iowa, have invented a new and useful Improvement in Grain-Separating Screens for Thrashing-Machines, of which the following is a specification.

In thrashing-machines the long straw and grain are thrown out from the thrashing-cylinder upon a separating-platform, which carries off the long straw by vibrating movement, opening and shaking it, and separating the grain therefrom, and delivers it through openings in said platform. The grain is thus delivered, together with chaff, weeds, heads, and pieces of short straw, forming a considerable proportion of light stuff mixed with the grain. For cleaning this grain I have provided a sheet-metal platform-screen especially suited for use with a primary separating-platform, which is mounted and operated beneath it.

My purpose is to provide a chaffing-screen of transverse rows of openings which will give better effect to the air-blast in lifting and floating the light bodies from and over the surface between the openings, while the grain passes freely from said surface through the openings. The precise improvement for this purpose I will point out in the concluding claims in connection with the drawings illustrating the same.

Referring to the drawings, Figure 1 shows in top view so much of a sheet-metal platform-screen as illustrates my improvement in the separating-surface. Fig. 2 is a vertical longitudinal section of the same, taken mediately of one of the rows of transverse openings. Fig. 3 is a similar section taken on the line $x\ x$ of Fig. 1, showing the scoop form of the separating-surface. Fig. 4 is a section on the line $z\ z$ of Fig. 1, showing the double-scoop form of the separating-surface, looking toward the outer end. Fig. 5 shows in perspective the double-scoop formation of one of the transverse strips. Fig. 6 is a transverse section taken through one of the openings, and Fig. 7 is a diagram of the shape of the opening.

In the drawings I have shown the screening-surface, which is formed with longitudinal corrugations $a$, and between them the surface is divided by transverse cuts into strips which are struck up so as to form the separating-surface and the openings.

It will be understood that the platform is mounted to have an endwise vibratory movement and an air-blast provided beneath it directed up through the openings in the direction of the movement of the light stuff from the platform. The openings join the corrugations at their base-lines, and the cuts by which the openings are formed are of the shape of what is known in archery as "cupid's bow." The distance between the corrugations is about two and a half inches, (more or less,) as may be desired, and the distance between the openings is about an inch. The surface between these openings is formed so that one edge stands upward about on a level with the top line of the corrugations and toward the outer end of the platform, while the other edge stands downward below the base-line of the corrugations and to an extent greater than the projection above said line, so that full area of the opening between the upper edge of one strip and the under edge of the adjacent strip will be below the bottom of the corrugations, and the separating-surfaces of all the strips will stand toward the inner end of the platform to receive the blast from that direction. In the middle of their length the strips are formed with a convex ridge $b$ on the upper surface, which merges on each side into a concave scoop form, which extends to the base-line of the corrugations and forms a double-scoop surface, the concavity of which increases in depth from the lower to the upper edge of the strip. The lines of these scoop-surfaces are regular and uniform from the point $c$ to the point $d$ across the strip and from the base of the corrugation at $e$ to its joining the convex ridge in the length of the strip. The pitch of the convex ridge is straight about forty-five degrees from a vertical line, and the scoop-surfaces on each side give a free and full action of the air-blast from edge to edge of the strip, so that the air acts to lift and float the light stuff over the edges and the openings, while the grain freely passes down the scoop-surfaces through the opening. The double-scoop surface and middle ridge gives the upper edge of the strip a concave set-back $f$ at the ridge and a cyma-reversa curve extending therefrom to the corrugation. In the upper deepest part of the scoops this curve forms the lobes *g g* on each side of the middle set-back curve. The middle ridge at the lower edge of the strip joins the scoop-surfaces on level between the points *c c*, and this gives the widest part of the opening between the upper set-back *f* and the lower points *c*, so that the air-blast has its greatest volume between and within the scoop-surfaces and the grain has its freest passage from the surfaces of its flattened lower edge *c c*. From this flattened surface part the opening decreases in width equally to each end. The hollows of the scoops are deep enough to give a slight holding of the air volume the better to lift the chaff particles and to carry them over the edge and the straw and weeds over upon the flat surfaces *j j* along the corrugations, over which surfaces such matter slides to the next surface. These flat surfaces are of triangular shape and extend from the upper edge at each end of the opening along the base of the corrugations for about one-half of the width of the strip, as seen in Fig. 1.

The form of the scoop-surfaces and their relation to the middle ridge provides an effective action to the air-blast upon the falling grain as it descends upon the two scoops, while at the same time such form facilitates the lifting of the light stuff and carrying it over the deepest parts of the scoops, and this is one of the important advantages of the twin-scoop construction in the secondary separation.

I claim as my improvement—

1. A sheet metal screen for separating grain having longitudinal corrugations and transverse openings between them, the strips providing said openings, each being formed with a transverse convex ridge mediately of its length and with scoop like hollows on each side of said ridge extending in continuous and unbroken curves to the base of the corrugations and to the flat surfaces at the upper edges and ends of said strips the said median ridge having its greatest convexity at the upper edge and merging into a flat surface at the lower edge of the strip for the purpose stated.

2. A sheet metal grain separating screen having longitudinal corrugations and transverse openings between them, the strips providing said openings each being formed with a convex ridge mediately of its length and having its greatest convexity at the upper edge and merging into a flat surface at the lower edge, the surface on each side of said ridge formed scoop-like with continuous and unbroken curves extending to the corrugations, for the purpose stated.

CHARLES CLOSZ.

Witnesses:
A. E. H. JOHNSON,
A. ROLAND JOHNSON.